United States Patent Office 3,242,736
Patented Mar. 29, 1966

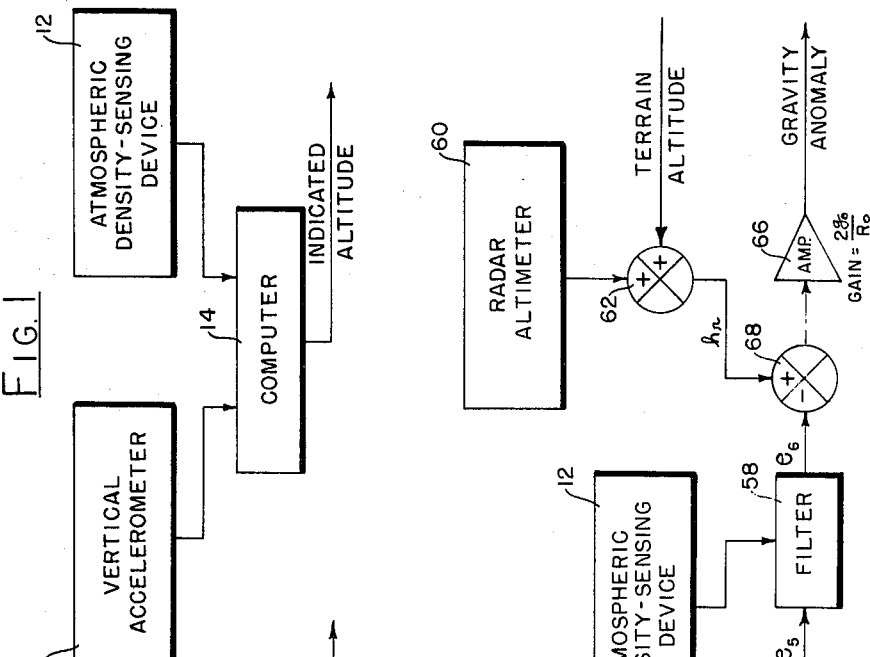
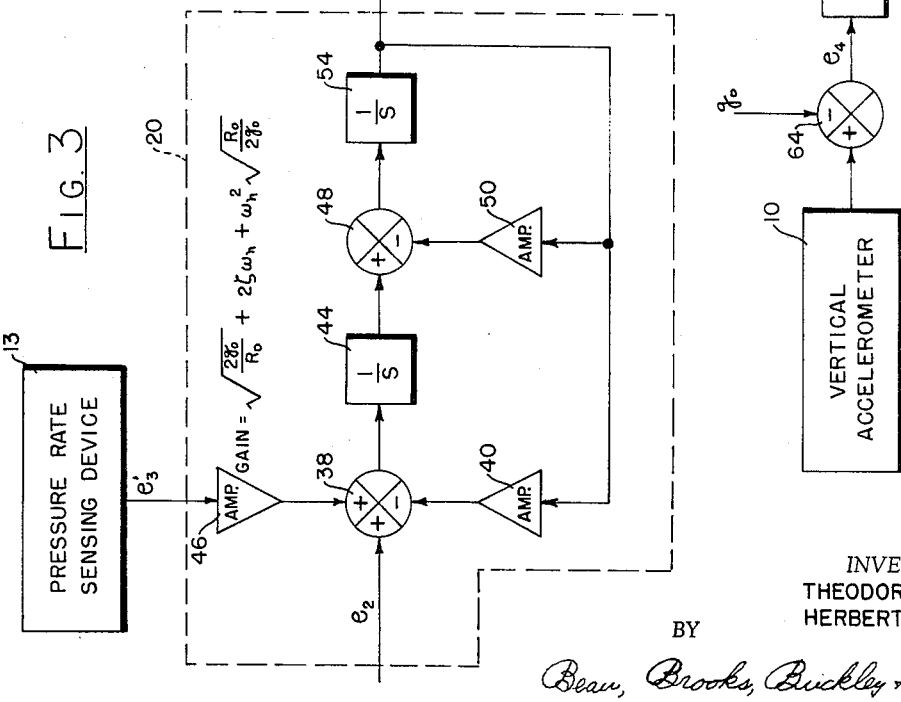

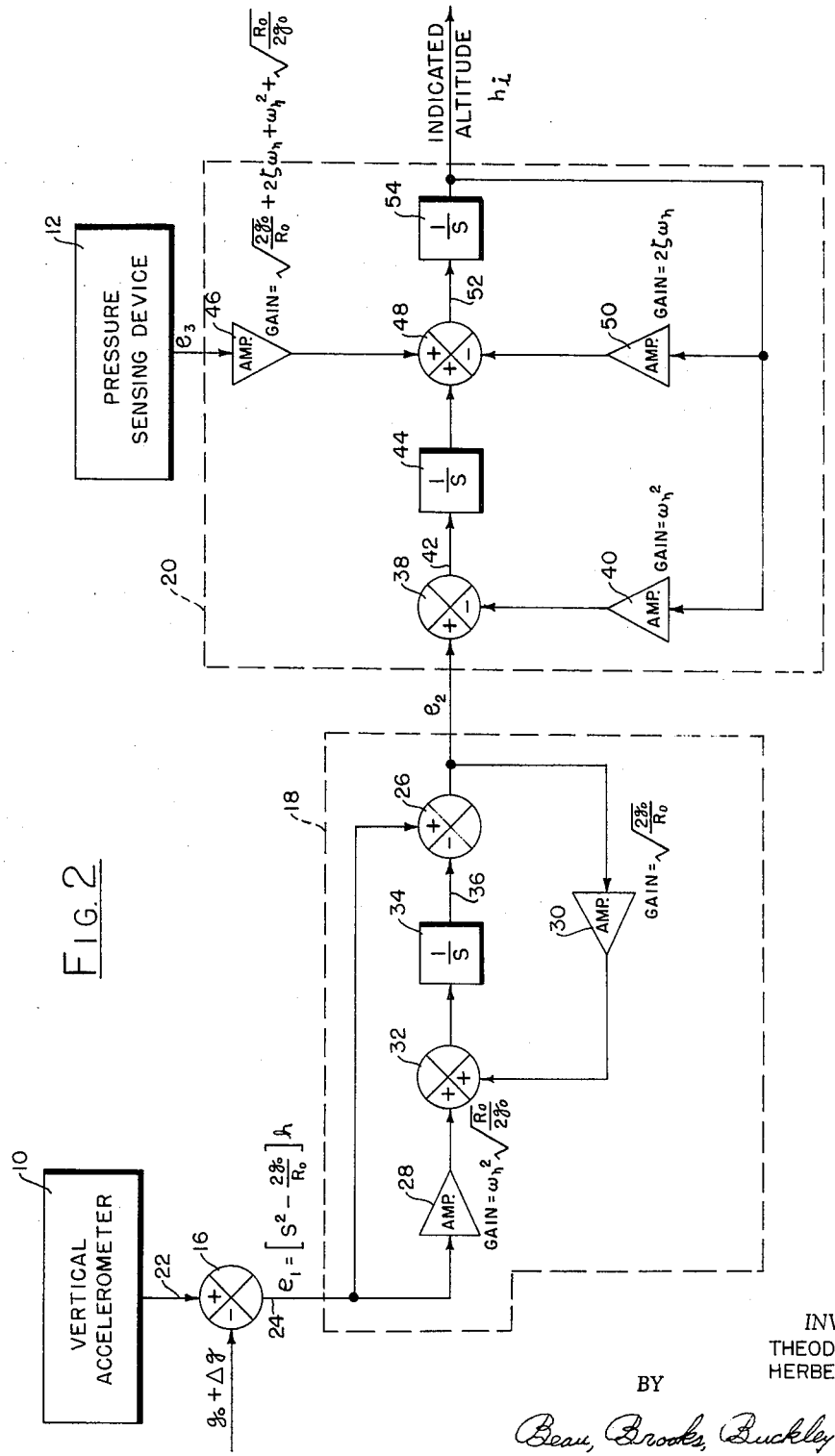

3,242,736
ALTIMETER SYSTEM
Herbert Winter, Snyder, and Theodore L. Roess, Tonawanda, N.Y., assignors to Bell Aerospace Corporation, Wheatfield, N.Y.
Filed Oct. 1, 1963, Ser. No. 313,042
9 Claims. (Cl. 73—384)

This invention relates to inertial navigation and pertains, more particularly, to instrumentation of the vertical channel.

In an airborne device having a vertical acceleration component, it is difficult to instrument the vertical channel so as to obtain a highly accurate altitude measurement. Systems employing double integration of vertical acceleration have been, so far, plagued by inherent instability whereas systems which slave the vertical channel to the steady state value of altitude from some reference such as a radar altimeter or a pressure-sensing device, are limited in their accuracy by the accuracy of the reference. Since radar altimeters measure the distance above the underlying terrain, itself a variable, and since pressure-sensing devices are subject to pressure variations due not only to altitude but also to time and place, any such reference system may not provide an accurate measurement. In other words, a radar altimeter or a pressure-sensing device may not provide sufficiently accurate steady state altitude measurement as a function of time and place.

The present invention takes advantage of the fact that the earth's gravity field is comparatively constant as a function of time and is reasonably well known as a function of position. Thus, accurate measurement of steady state altitude may be made as a function of gravity. Moreover, since gravity changes very slowly with altitude; in a device having a component of vertical acceleration, and speaking of a frequency spectrum involved in altitude measurement; the information component of measurement contributed by altitude-modulated gravity measurement might be termed to be of low frequency characteristic whereas the component of measurement contributed by acceleration measurement would be of high frequency characteristic. Thus, in comparison to systems such as are described above, a system employing measurement concerned with acceleration and altitude-modulated gravity would obviate the inherent inaccuracy of the low frequency component; it being noted that the direct measurements made by radar altimeter or the pressure-sensing device of the above systems would contribute the low frequency information components. However, to provide a dynamically exact vertical measurement, a separate midfrequency information component is required. The midfrequency information component is contributed in the present invention by a sensing means or device capable of indicating altitude-modulated characteristics of ambient atmosphere such as pressure, density, or temperature, for example. Thus, the sensing device may be an atmospheric pressure or density sensing means in which only the midfrequency (altitude modulated) component of its output is used, eschewing any steady state (low frequency) altitude output of such device. Accordingly, it is of primary concern in connection with this invention to provide a device for accurately measuring altitude by making use of low, mid and high frequency information components as described above.

More specifically it is an object of this invention to provide, in a measuring instrument, an accurate altitude indication by using an accelerometer to measure both acceleration and altitude-dependent gravity to provide the high and low frequency information components, and sensing means to provide an altitude rate midfrequency information component.

Another object of this invention resides in the provision of a system for determining local gravity anomaly, in which the above described frequency components are used to provide an output which is a function of both altitude and the local gravity anomaly; this output being then algebraically summed with a radar altimeter output to determine the local gravity anomaly.

Other advantages and objects of the invention will appear from the description hereinbelow and the accompanying drawing wherein:

FIG. 1 is a block diagram illustrating the principles of this invention;
FIG. 2 is a block diagram showing a specific embodiment of the system of FIG. 1;
FIG. 3 is a block diagram illustrating a modified embodiment of the invention; and
FIG. 4 is a block diagram illustrating a system for determining local gravity anomaly.

Referring first to FIG. 1, the system as shown therein will be seen to consist of vertical accelerometer means 10, an atmospheric density-sensing device 12 and computer means 14. The accelerometer means 10 has an output $a$ according to the following, in $s$ operator form:

(1) $$a = g + s^2 h$$

where
  $g$ = altitude-dependent value of gravity
  $h$ = altitude
  $s^2 h = d^2h/dt^2$ (vertical acceleration)

It will be appreciated that this output $a$ comprises a high frequency information component ($s^2h$) and a low frequency information component ($g$); the latter component necessarily being of low frequency since the value of $g$ will vary only slowly with change of altitude $h$. To illustrate this point, the value of $g$ is:

(2) $$g = \frac{g_o R_o^2}{(R_o + h)^2} + \Delta g$$

where
  $g_o$ = value of $g$ at earth's surface, corrected for latitude
  $R_o$ = earth's radius
  $\Delta g$ = local gravitational anomaly
  $h$ = altitude To fill in the frequency spectrum between the above low and high frequency information components, a midfrequency component is provided by an altitude-modulated component of the output of the sensing means 12. Thus, the entire spectrum of low, mid and high frequency information components may be operated upon by the computer means 14 to give a highly accurate indication of altitude. It should be noted that since the low frequency information is derived from gravity measurement, and since the earth's gravity field is comparatively constant as a function of time and is reasonably well known as a function of position, the low frequency or steady state information will be highly accurate compared to prior art systems using atmospheric density-sensing means or the like for the low frequency or steady state information.

Moreover, it is to be noted in connection with the system of the present invention that the sensing means 12, whether the same be responsive to pressure, density, temperature or the like, will have in its output components which are representative of the steady state value of altitude (albeit such steady state value may be highly inaccurate) and derivatives thereof with respect to time. Whereas the computer or filter means associated with the accelerometer and the sensing means is responsive to the low frequency (steady state) and high frequency components of the accelerometer output, such means is not responsive to the steady state output of the sensing means 12, but only to the first and/or higher derivatives thereof.

That is to say, in the frequency spectrum which is processed by the computer or filter means 14 of FIG. 1, the low frequency component of the accelerometer output (essentially a steady state value of altitude as reflected by altitude-dependent gravity) plus the high frequency component of the accelerometer output (acceleration) and the mid frequency component of the sensing means output (essentially altitude rate) are utilized in the processing function, while the steady state value of altitude or low frequency component in the output of the sensing means 12 is ignored. In this way, inherent inaccuracies which have plagued prior art systems are largely eliminated so that the resultant altitude output of the computer or filter means 14 is inherently of much greater accuracy than systems heretofore known.

To illustrate an operative embodiment of the invention, reference will now be had to FIG. 2. In this figure, the computer means will be seen to consist of the summing network 16, the filter 18 and the filter 20. For simplification, an approximation for $g$ of Equation 2 neglecting terms in $h/Ro$ of second and higher order is used, as follows:

$$(3) \qquad g = go\left(1 - \frac{2h}{R_o}\right) + \Delta g$$

Using this approximation, the output 22 of the accelerometer 10 to the summing network 16 becomes:

$$(4) \qquad r = go\left[1 - \frac{2h}{R_o}\right] + \Delta g + s^2 h$$

The summing network 16 is connected to means (not shown) for subtracting the known values of $go$ and $\Delta g$ from Equation 4 yielding an output $e_1$ at 24 of the summing network which comprises the high and low frequency components as follows:

$$(5) \qquad e_1 = \left[s^2 - \frac{2go}{R_o}\right]h$$

The natural frequency $\omega_n$ and damping ratio $\zeta$ of the filter 20 are chosen to provide inherent stability for the system and the transfer function of the filter 18 is chosen to match the basic accelerometer output to the nautral frequency of the filter 20. The transfer function of the filter 18 is, in $s$ operator form:

$$(6) \qquad \frac{e_2}{e_1}(s) = \frac{s - \omega_n^2 \sqrt{\frac{Ro}{2go}}}{s + \sqrt{\frac{2go}{Ro}}}$$

For this purpose, in FIG. 2, the output $e_1$ is applied to the summing network 26 and to an amplifier 28 whose gain is $$\omega_n^2 \sqrt{\frac{Ro}{2go}}$$

The output $e_2$ of the filter 18 is fed back through the amplifier 30 whose gain is $\sqrt{2go/Ro}$ and the outputs of these two amplifiers 28 and 30 are summed in the network 32. The output of the summing network is applied to the integrator 34, the output 36 of the integrator being as follows:

$$(7) \qquad \text{integrator 34 output} = \frac{1}{s}\left[e_1\omega_n^2\sqrt{\frac{Ro}{2go}} + e_2\sqrt{\frac{2go}{Ro}}\right]$$

The integrator output and the output $e_1$ are summed in the network 26 to provide the output $e_2$ as follows:

$$(8) \qquad e_2 = e_1 - \frac{1}{s}\left[e_1\omega_n^2\sqrt{\frac{Ro}{2go}} + e_2\sqrt{\frac{2go}{Ro}}\right]$$

which, upon gathering terms and rearranging yields:

$$(9) \qquad \frac{e_2}{e_1} = \frac{s - \omega_n^2\sqrt{\frac{Ro}{2go}}}{s + \sqrt{\frac{2go}{Ro}}}$$

Since Equation 9 is identical with Equation 6, the filter 18 performs the proper function.

To provide an indicated altitude output $hi$ for the filter 20, in which any steady state value of altitude contributed by the output $e_3$ of the pressure sensing means 12 is eliminated, its transfer functions are as follows:

$$(10) \qquad \frac{hi}{e_2}(s) = \frac{1}{s^2 + 2\zeta\omega_n s + \omega_n^2}$$

$$(11) \qquad \frac{hi}{e_3}(s) = \frac{\left[\sqrt{\frac{2go}{Ro}} + 2\zeta\omega_n + \omega_n^2\sqrt{\frac{Ro}{2go}}\right]s}{s^2 + 2\zeta\omega_n s + \omega_n^2}$$

The filter 20 includes the summing network 38 to which the output $e_2$ as well as the term $h_i\omega_n^2$ are applied as shown, the latter term being obtained by applying the output $h_i$ of the filter 20 to the amplifier 40 having a gain equal to $\omega_n^2$. Since, from Equations 5 and 6, $$e_2 = \left[s^2 - \left(\sqrt{\frac{2go}{Ro}} + \omega_n^2\sqrt{\frac{Ro}{2go}}\right)s + \omega_n^2\right]h$$

the output 42 of the summing network is $$\left[s^2 - \left(\sqrt{\frac{2gs}{Ro}} + \omega_n^2\sqrt{\frac{Ro}{2go}}\right)s\right]h$$

and this expression becomes, after integration by the integrator 44, $$\left[s - \sqrt{\frac{2go}{Ro}} - \omega_n^2\sqrt{\frac{Ro}{2go}}\right]h$$

The output $e_3 = h$ of the pressure sensing device 12 containing a steady state altitude or low frequency component as well as the first and possibly higher derivatives thereof constituting a mid frequency component is applied to the amplifier 46 whose gain is $$\sqrt{\frac{2go}{Ro}} + 2\zeta\omega_n + \omega_n^2\sqrt{\frac{Ro}{2go}}$$

The amplifier output is applied to the summing network 48 together with the aforementioned output of the integrator 44 and the output of an amplifier 50 whose gain is $2\zeta\omega_n$ and which, like the amplifier 40, is connected to the output of the filter 20. Since the outputs of the amplifiers 46 and 50 are $$\left[\sqrt{\frac{2go}{Ro}} + 2\zeta\omega_n + \omega_n^2\sqrt{\frac{Ro}{2go}}\right]h$$

and $2\zeta\omega_n h$, respectively, and the output of the integrator 44 is $$\left[s - \sqrt{\frac{2go}{Ro}} - \omega_n^2\sqrt{\frac{Ro}{2go}}\right]h$$

their algebraic summation as indicated for the network 48 yields an output 52 equal to $sh$ which, after integration by the integrator 54, is equal to $h$, showing that the indicated altitude output of the filter 20 $h_i$ is indeed equal to the true altitude $h$.

The modification according to FIGURE 3 involves the use of a pressure rate sensing device 13 for the atmospheric density sensing means 12. In this case, since it is a rate of density change which is being measured, the output $e_3'$ of the means 13 is equal to $sh$ so that the output of the amplifier 46 becomes $$\left[\sqrt{\frac{2go}{Ro}} + 2\zeta\omega_n + \omega_n^2\sqrt{\frac{Ro}{2go}}\right]sh$$

requiring that this output be applied to the summing network 38 rather than the summing network 48 as in FIG. 2. The output $h_1$ of the filter 20 is the same in either case, the only difference between FIGS. 2 and 3 being the point of application of the output of the sensing means, dependent upon the specific type of device selected for this means. It is to be noted that for the form of the invention shown in FIG. 3, the transfer function of Equation 11 for the filter 20 becomes:

$$(12) \quad \frac{h_1}{e_3'}(s) = \frac{\sqrt{\frac{2go}{Ro}} + 2\zeta\omega_n + \omega_n^2\sqrt{\frac{Ro}{2go}}}{s^2 + 2\zeta\omega_n s + \omega_n^2}$$

The significance of the transfer functions of Equations 11 and 12 becomes apparent upon considering that, in FIG. 2, the sensing means output $e_3$ will comprise the low frequency, steady state altitude component as well as the midfrequency altitude rate component which is dependent upon altitude-modulation of ambient atmospheric characteristics. Moreover, the output $e_3$ in FIG. 2 may be afflicted by a constant error due to variations in atmospheric pressure as a function of time and position, so that this output $e_3$ may be equal to $h+k$, where $k$ is the constant error. However, since the numerator of the transfer function of Equation 11 contains the operator $s$ and since the derivatives of constants are zero, the output $h_1$ will not be affected by any steady state or low frequency component in the output $e_3$ of the pressure sensing means 12. In FIG. 3, the output $e_3'$ will not be afflicted by steady state errors or low frequency components since the means 13 is, in this case, measuring a rate of change of atmospheric density. Thus, in either case, the low frequency or steady state value of the altitude indication $h_1$ is derived only from the gravity measurement of the accelerometer.

The approximation for $g$ given in Equation (3) neglects terms of Equation (2) in $$\frac{h}{Ro}$$

of second and higher order and will introduce intolerable error for high altitudes (in the order of 100,000 feet and higher). Correction for these terms may be made by adjusting the gains of the amplifiers 28 and 30 of the filter 18 as a function of the approximate altitude.

Another use of this instrumentation is the application for an airborne gravimetric survey. If the altitude of the craft is known, the gravitational anomaly may be measured. In this case, the system represented in FIG. 4 may be used where the filters 56 and 58 are identical to the previously described filters 18 and 20. The true value of altitude $h_r$, may be supplied by a radar altimeter 60 and a knowledge of terrain altitude as indicated by the summation in network 62, or, if over the ocean, by a radar altimeter alone. The output of the system shown in FIG. 4 represents the gravitational anomaly $\Delta g$.

The output $e_4$ of adding network 64 is represented by the expression $a-g_0$, which can be expressed as follows, in $s$ operator form:

$$(13) \quad \left(s^2 - \frac{2go}{Ro}\right)h + \Delta g$$

The output of $e_5$ of filter 56 then becomes:

$$(14) \quad e_5 = \left[s^2 - \left(\sqrt{\frac{2go}{Ro}} + \omega_n^2\sqrt{\frac{Ro}{2go}}\right)s + \omega_n^2\right]h + \left[\frac{s - \omega_n^2\sqrt{\frac{Ro}{2go}}}{s + \sqrt{\frac{2go}{Ro}}}\right]\Delta g$$

The output of filter 58 will then be:

$$(15) \quad e_6 = h + \frac{s - \omega_n^2\sqrt{\frac{Ro}{2go}}}{\left(s + \sqrt{\frac{2go}{Ro}}\right)(s^2 + 2\zeta\omega_n s + \omega_n^2)}\Delta g$$

The steady state value of $e_6$ can now be obtained by setting $s$ equal to zero in Equation 15, yielding:

$$(16) \quad e_{6_{ss}} = h - \frac{Ro}{2go}\Delta g$$

Adding network 64 will then subtract the output $e_{6ss}$ of filter 58 from the output of the adding network 62 to yield:

$$(17) \quad h_r - e_{6_{ss}} = \frac{Ro}{2go}\Delta g$$

The output of adding network 68 is then multiplied by the gain of amplifier 66 to yield the gravity anomaly $\Delta g$.

It is to be understood that certain changes and modifications as illustrated and described may be made without departing from the spirit of the invention or the scope of the following claims.

We claim:
1. In a measuring instrument, in combination,
   accelerometer means which has an output indicative of vertical acceleration and altitude-dependent gravity to provide high and low frequency information components respectively,
   sensing means which has an altiude-modulated midfrequency information component output due to vertical motion,
   and computer means having input means connected to the outputs of said accelerometer means and said sensing means whereby said high, mid and low frequency information components are combined to provide an output indicative of altitude.
2. In a measuring instrument as defined in claim 1 including a radar altimeter for determining the altitude above sea level, and summing means algebraically adding the outputs of said radar altimeter and said computer means and having an output indicative of local gravity anomaly.
3. In a measuring instrument, in combination,
   an accelerometer oriented for response in a vertical direction and having an output comprised of a high frequency component indicative of vertical acceleration and a low frequency component indicative of altitude-modulated gravity,
   sensing means having a midfrequency output component indicative of altitude rate,
   and filter means having input means connected to the outputs of said accelerometer means and said sensing means whereby said high, mid and low frequency components are combined to provide an altitude output affected only by such inputs.
4. In a measuring instrument, in combination,
   filter means having a natural frequency $\omega_n$, damping ratio $\zeta$ and an output $h_1$ indicative of altitude,
   accelerometer means having an output $e$ connected to said filter means,
   and ambient atmosphere sensing means having an output $h_p$ connected to said filter means,
   the output of said accelerometer means being equal to

$$\left[s^2 - \left(\omega_n^2\sqrt{\frac{R}{2go}} + \sqrt{\frac{2go}{R}}\right)s + \omega_n^2\right]h$$

where
$R$ = earth's radius
$go$ = earth's gravity corrected for latitude
$h$ = altitude
$s$ = Laplace operator said filter means having Laplace transfer functions according to the following:

$$\frac{h_i}{e}(s) = \frac{1}{s^2 + 2\zeta\omega_n s + \omega_n^2}$$

$$\frac{h_i}{h_p}(s) = \frac{\left[\sqrt{\frac{2go}{R}} + 2\zeta\omega_n + \omega_n^2\sqrt{\frac{R}{2go}}\right]s}{s^2 + 2\zeta\omega_n s + \omega_n^2}$$

5. In a measuring instrument, in combination,
filter means having a natural frequency $\omega_n$, damping ratio $\zeta$ and an output $h_i$ indicative of altitude,
accelerometer means having an output $e$ connected to said filter means,
and ambient atmosphere sensing means having an output $h_p$ connected to said filter means,
the output of said accelerometer means being equal to $$\left[s^2 - \left(\omega_n^2\sqrt{\frac{R}{2go}} + \sqrt{\frac{2go}{R}}\right)s + \omega_n^2\right]h$$

where
R=earth's radius
go=earth's gravity corrected for latitude
h=altitude
s=Laplace operator said filter means having Laplace transfer functions according to the following:

$$\frac{hi}{e}(s) = \frac{1}{s^2 + 2\zeta\omega_n s + \omega_n^2}$$

$$\frac{hi}{h_p} = \frac{\sqrt{\frac{2go}{R}} + 2\zeta\omega_n + \omega_n^2\sqrt{\frac{R}{2go}}}{s^2 + 2\zeta\omega_n s + \omega_n^2}$$

6. In a measuring instrument, in combination,
an accelerometer oriented for response in a vertical direction and having an output comprised of a high frequency component indicative of vertical acceleration and a low frequency component indicative of altitude-dependent gravity,
sensing means having an output comprised of a low frequency component indicative of altitude and a midfrequency component indicative of altitude rate,
and computer means having input means connected to the outputs of said accelerometer and said sensing means and including filter means for eliminating said low frequency component of the sensing means output whereby said high and low frequency components of the accelerometer output and said midfrequency component of the sensing means output are combined to provide an output indicative of altitude.

7. In a measuring instrument, in combination,
an accelerometer oriented for response in a vertical direction and having an output indicative of vertical acceleration and of altitude-modulated gravity,
means for subtracting the value $g_o$ of earth's gravity at know altitude from the output of said accelerometer and having an output $e$,
atmospheric density-sensing means having an output $h_p$ indicative of altitude,
filter means whose inputs are said output $e$ and said atmospheric density-sensing means output $h_p$ and whose output $h_i$ is indicative of altitude,
said filter means having Laplace transfer functions according to the following:

$$\frac{hi}{e}(s) = \frac{s - \omega_n^2\sqrt{\frac{Ro}{2go}}}{\left(s + \sqrt{\frac{2go}{Ro}}\right)(s^2 + 2\zeta\omega_n s + \omega_n^2)}$$

$$\frac{hi}{h_p}(s) = \frac{\left(\sqrt{\frac{2go}{R_o}} + 2\zeta\omega_n + \omega_n^2\sqrt{\frac{Ro}{2go}}\right)}{s^2 + 2\zeta\omega_n s + \omega_n^2}$$

where
$R_o$=earth's radius
$s$=Laplace operator
$\omega_n$=natural frequency of said filter
$\zeta$=damping ratio of said filter 8. In a measuring instrument, in combination,
an accelerometer oriented for response in a vertical direction and having an output indicative of vertical acceleration and of altitude-modulated gravity,
means for subtracting the value $g_o$ of earth's gravity at known altitude from the output of said accelerometer and having an output $e$,
atmospheric density-sensing means having an output $h_p$ indicative of altitude rate,
filter means whose inputs are said output $e$ and said atmospheric density-sensing means output $h_p$ and whose output $h_i$ is indicative of altitude,
said filter means having Laplace transfer functions according to the following:

$$\frac{hi}{e}(s) \frac{s - \omega_n^2\sqrt{\frac{Ro}{2go}}}{s + \sqrt{\frac{2go}{Ro}}s^2 + 2\zeta\omega_n s + \omega_n^2}$$

$$\frac{hi}{h_p}(s) \frac{\sqrt{\frac{2go}{Ro}} + 2\zeta\omega_n + \omega_n^2\sqrt{\frac{Ro}{2go}}}{s^2 + 2\zeta\omega_n s + \omega_n^2}$$

where
$R_o$=earth's radius
$s$=Laplace operator
$\omega_n$=natural frequency of said filter
$\zeta$=damping ratio of said filter 9. An altitude measuring instrument comprising, in combination,
an accelerometer oriented for response in a vertical direction and having an output comprised of a low frequency component indicative of altitude-dependent gravity and a high frequency component indicative of acceleration,
sensing means having an output comprised of a steady state value of altitude and derivatives thereof,
filter means connected to the accelerometer and sensing means whereby the outputs of said accelerometer and said sensing means are inputs thereto to provide an altitude output derived only from the low and high frequency components of the accelerometer output and the derivatives of the steady state output of said sensing means.

References Cited by the Examiner

UNITED STATES PATENTS

| | | | |
|---|---|---|---|
| 2,775,122 | 12/1956 | Smith et al. | 73—179 |
| 2,930,035 | 3/1960 | Altekruse | 73—178 X |
| 2,934,267 | 4/1960 | Wirkler et al. | |
| 3,052,122 | 9/1962 | Westerback | 73—178 |

LOUIS R. PRINCE, *Primary Examiner.*

D. O. WOODIEL, *Assistant Examiner.*